United States Patent [19]

Kanno et al.

[11] Patent Number: 4,571,968
[45] Date of Patent: Feb. 25, 1986

[54] STEEL FRAME SHEARING APPARATUS

[75] Inventors: Samon Kanno; Naotomo Kaneko; Takaharu Kozaki, all of Tokyo, Japan

[73] Assignee: Sango Jyuki Kabushiki Kaisha, Tokyo, Japan

[21] Appl. No.: 647,581

[22] Filed: Sep. 5, 1984

[30] Foreign Application Priority Data

Sep. 5, 1983 [JP] Japan .................................. 58-163082

[51] Int. Cl.$^4$ ............................................. B21D 31/02
[52] U.S. Cl. ........................................ 72/331; 100/95; 100/98 R
[58] Field of Search ................... 72/331, 334, 338, 71, 72/70; 100/94, 95, 98 R

[56] References Cited

U.S. PATENT DOCUMENTS

| 426,677 | 4/1890 | Owens | 72/331 |
|---|---|---|---|
| 2,214,110 | 9/1940 | Ott | 72/331 |
| 3,273,493 | 9/1966 | Smiltneek | 100/98 R X |
| 4,196,862 | 4/1980 | Tagawa | 241/266 |

FOREIGN PATENT DOCUMENTS 49273 11/1981 Japan .

Primary Examiner—Frank T. Yost
Attorney, Agent, or Firm—Sughrue, Mion, Zinn, Macpeak and Seas

[57] ABSTRACT

A pair of side plates are provided in opposing and spaced relationship, a pair of jaw members are pivoted to a pair of main shafts extending between said side plates, a pair of opposing crushing blades are mounted on the leading end side of said jaw members for pinching and partially crushing a workpiece positioned therebetween in response to the closing movement of said jaw members and a pair of shearing blades are mounted on the base end side of the jaw members for shearing off said workpiece on the crushed portions of the workpiece in response to the closing movement of the jaw members.

4 Claims, 10 Drawing Figures

4,571,968

STEEL FRAME SHEARING APPARATUS

BACKGROUND OF THE INVENTION

This invention relates to a steel frame shearing apparatus suitably employed for shearing off shaped steel materials, steel frames in concrete structures and steel body frames when demolishing automobiles.

Hitherto, as the shearing apparatus of the above type, there have been proposed crushing type apparatus in which opposing blades crush and pinch off workpieces and scissors type apparatus in which opposing shearing blades shear off workpieces. In shearing by the use of opposing blades, the opposing blades require a substantial force in shearing off workpieces and the cutting edges of the blades tend to nick easily. And since workpieces tend to slip towards the leading ends of the blades, the blades need to have a length sufficient to accommondate the slippage of workpieces. In shearing by the use of shearing blades, when workpieces of limited thickness are to be sheared off, the workpiece is caught in between the shearing blades and when workpieces of considerable thickness are to be sheared off, the blades tend to slip laterally from the workpieces, and thus the apparatus cannot shear off workpieces satisfactorily. In short, a shearing apparatus with shearing blades is suitably employed only for shearing-off workpieces which can be accommodated by the blades and thus, the application and performance of such shearing apparatus are limited. Further, in this type of shearing apparatus, there is also the problem that workpieces slip towards the leading ends of the blades.

SUMMARY OF THE INVENTION

Thus, the present invention is to provide a steel frame shearing apparatus which can effectively eliminate the drawbacks inherent in the prior art steel frame shearing apparatus referred to hereinabove and which can satisfactorily shear off workpieces having different shapes and dimensions.

In order to attain the above-mentioned purpose, accoding to the present invention, a pair of jaw members are pivoted to a pair of main shafts extending between a pair of opposing side plates, a pair of opposing crushing blades are mounted on the leading end side of the jaw members for pinching and partially crushing a workpiece therebetween in response to the closing movement of the jaw members and a pair of shearing blades are mounted on the base end side of the jaw members for shearing off the workpiece on the crushed portions of the workpiece in response to the closing movement of the jaw members.

The above and other objects and attendant advantages of the present invention will be more readilly apparent to those skilled in the art from a reading of the following detailed description in conjunction with the accompanying drawings which show preferred embodiments of the invention for illustrative purposes only, but not for the purpose for limiting the scope of the same in any way.

PREFERRED EMBODIMENTS OF THE INVENTION

Figure 1:
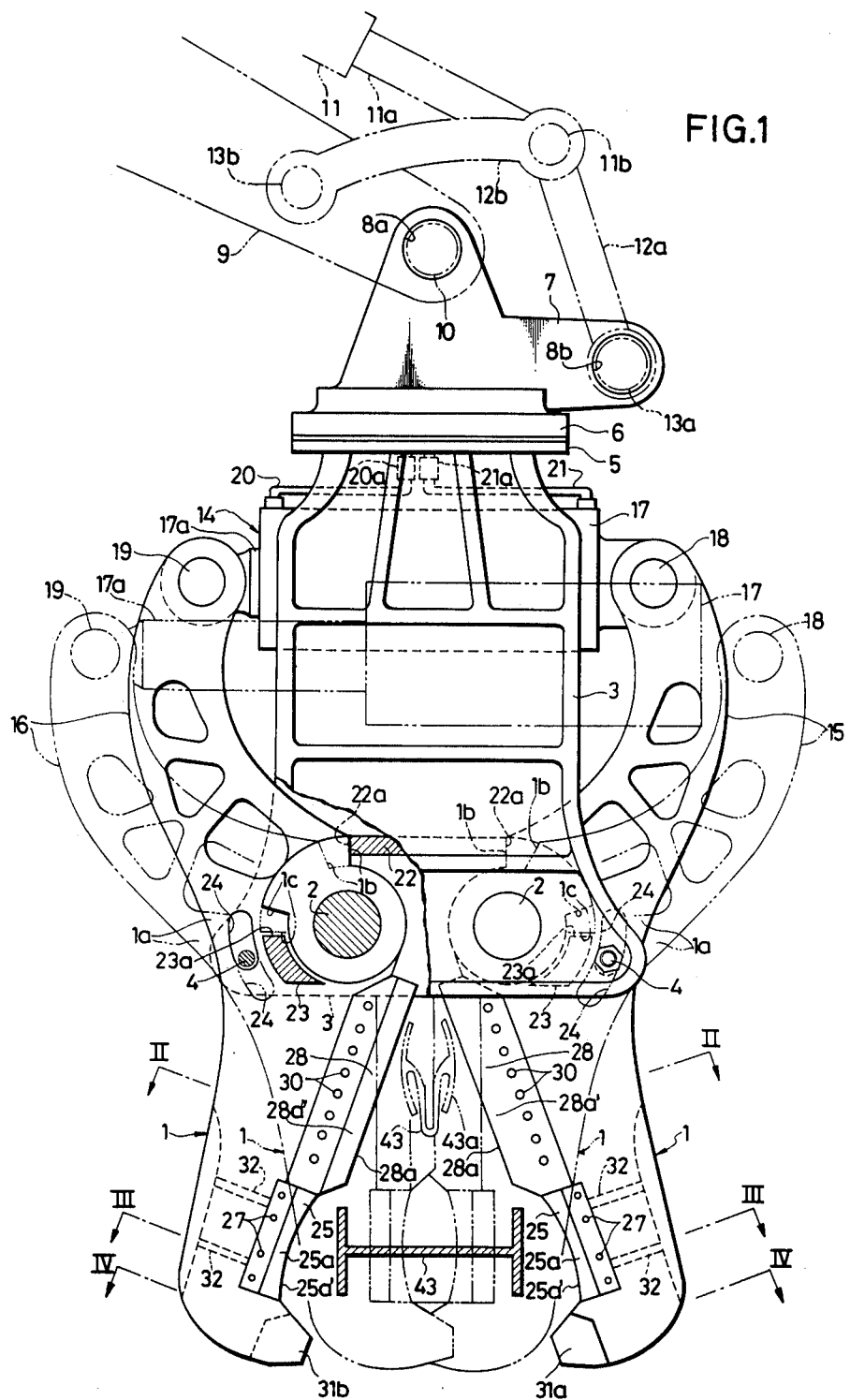
FIG. 1 is a side elevational view of a first embodiment of the steel frame shearing apparatus of the present invention with a portion thereof cut away.
Figure 3:
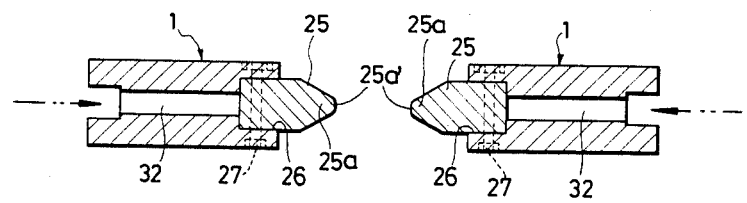
Figure 4:
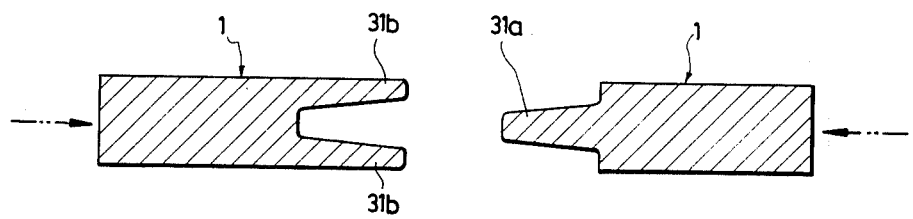

The present invention will be now described referring to the accompanying drawings which show preferred embodiments of the invention. FIG. 1 shows the first embodiment of the steel frame shearing apparatus of the invention. In FIG. 1, reference numeral 1, 1 denote a pair of opposing jaw members which are pivoted at the base ends 1a, 1a to a pair of main shafts 2, 2 extending between a pair of opposing side plates 3, 3. The side plates 3, 3 are connected together at their leading ends in a predetermined spaced relationship to each other by means of connector bolts 4, 4 and secured at their base ends to a swivel plate 5 which is in turn attached to an end plate 6 for swivel movement about its axis. Secured to the end plate 6 is a bracket member 7 having mounting holes 8a, 8b. The mounting hole 8a in the bracket member 7 has the arm 9 on the boom of a working machine such as a power shovel (not shown) pivoted thereto by means of a pin 10 and pivoted to the mounting hole 8b in the bracket member 7 and the arm 9 by means of pins 13a, 13b, respectively, are connector links 12a, 12b which are in turn pivoted at the other ends to a pin 11b at the leading end of the piston rod 11a of a hydraulic cylinder 11 mounted on the arm 9. As the piston rod 11a extends and retracts, the operation angle of the side plates 3, 3 and accordingly, of the jaw members 1, 1 is set. Reference numeral 14 denotes the drive mechanism for opening and closing the jaw members 1, 1. To describe the drive mechanism 14, projections 15, 16 extend from the base ends 1a, 1a of the jaw members 1, 1. The projection 15 is pivoted at the leading end to the cylinder head of the hydraulic cylinder 17 by means of a pin 18 whilst the projection 16 is pivoted at the leading end to the piston rod 17a of the hydraulic cylinder 17 by means of a pin 19. The hydraulic cylinder 17 is supplied with oil under presure from an oil supply source (not shown) through a hose 20 or a hose 21, alternately. When the cylinder 17 is supplied with oil from the supply source through the hose 20, the piston rod 17a is retracted and when the piston rod 17a has retracted completely, the jaw members 1, 1 engage a stopper member 22 and are held in their fully open position by the stopper member and, on the other hand, when the cylinder 17 is supplied with oil from the supply source through the hose 21, the piston rod 17a extends to move the jaw members 1, 1 to the closed position. Reference numerals 20a, 21a denote hydraulic couplings which connect the hoses 20, 21 to separate oil pressure conduits which extend from the oil pressure source. Reference numerals 22 and 23, 23 denote stopper members secured to the side plates 3, 3. When the jaw members 1, 1 abut at the shoulders 1b, 1b on their base ends against the opposite end faces 22a, 22a of the stopper member 22, the opening position of the jaw members 1, 1 is limited thereby and when the jaw members 1, 1 abut at the shoulders 1c, 1c on their base ends against the adjacent end faces 23a, 23a of the stopper members 23, 23, the closing position of the jaw members 1, 1 is limited thereby. The jaw members 1, 1 are provided with arcuate slots 24, 24 through which the above-mentioned connector bolts 4, 4 extend so that the jaw members 1, 1 can open and close without being obstructed by the bolts 4, 4. A pair of crushing blades 25, 25 are mounted on the leading end side of the jaw members 1, 1 in opposing relationship for pinching and crushing a workpiece 43 therebetween when the jaw members 1, 1 close. That is, as more clearly shown in FIG. 3, each of the crushing blades 25 is received in a recess 26 formed longitudinally in the opposing face at the leading end portion of the associated jaw member 1 and is held in position by means of a bolt 27. The cutting edge 25a of each crushing blade 25 is formed with an arcuate tip 25a'.

Figure 2:
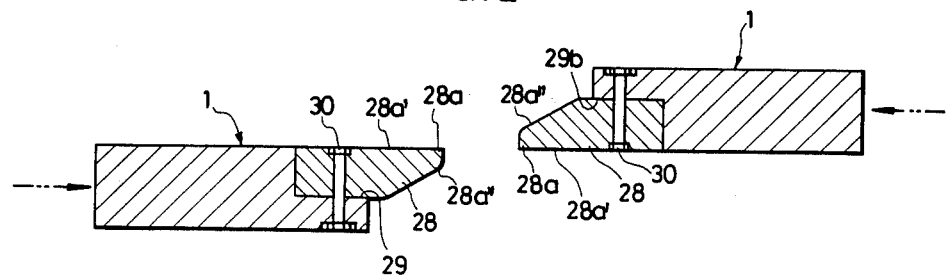
FIGS. 2, 3 and 4 are sectional views on an enlarged scale taken along the lines II—II, III—III and IV—IV of FIG. 1, respectively; p

A pair of shearing blades 28, 28 are mounted on the base end side of the jaw members 1, 1 in opposing relationship for shearing off crushed portions 43a of the workpiece 43 by the closing movement of the jaw members. That is, as is more clearly shown in FIG. 2, the base end portions of the jaw members are formed with blade mounting portions 29a and 29b and the shearing blades 28 are secured to the blade mounting portions of the associated jaws by means of bolts 30 so that the blade surfaces 28a' of the cutting edge 28a on the two shearing blades 28 are directed in opposite directions. The jaw members 1, 1 are further formed at the leading ends thereof with a pair of projections 31a, 31b extending in opposing relationship to each other and projecting inwardly from the cutting edge tips 25a', 25a' on the crushing blades 25, 25. Furthermore, the jaw member 1 is formed with a plurality of through holes 32, 32 extending from the outer surface into the associated recess 26 to recieve pusher bars (not shown) which are adapted to push the crushing blade 25 out of the associated recess 26.

Figure 5A:
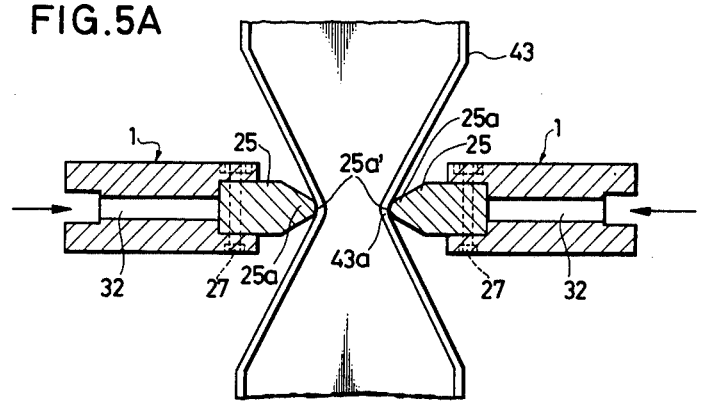
FIG. 5A is a sectional view on an enlarged scale showing the crushing operation by the crushing blades.
Figure 5B:
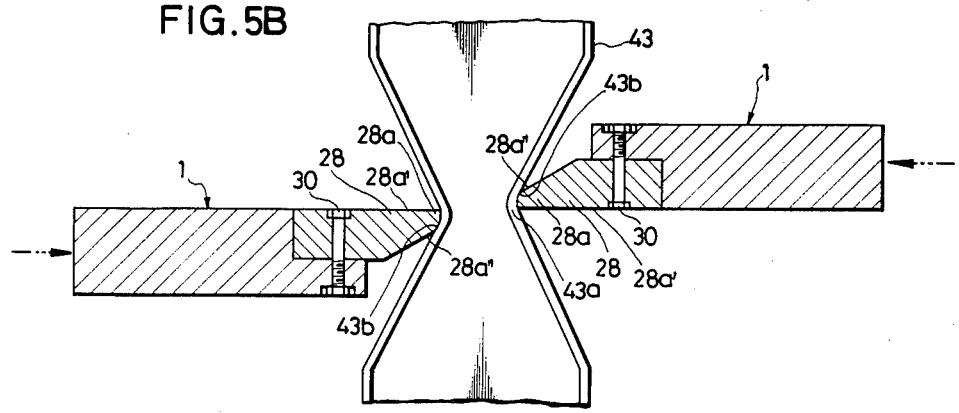
FIGS. 5B and 5C are cross-sectional views on an enlarged scale showing the successive steps in the shearing operation by the shearing blades.
Figure 5C:
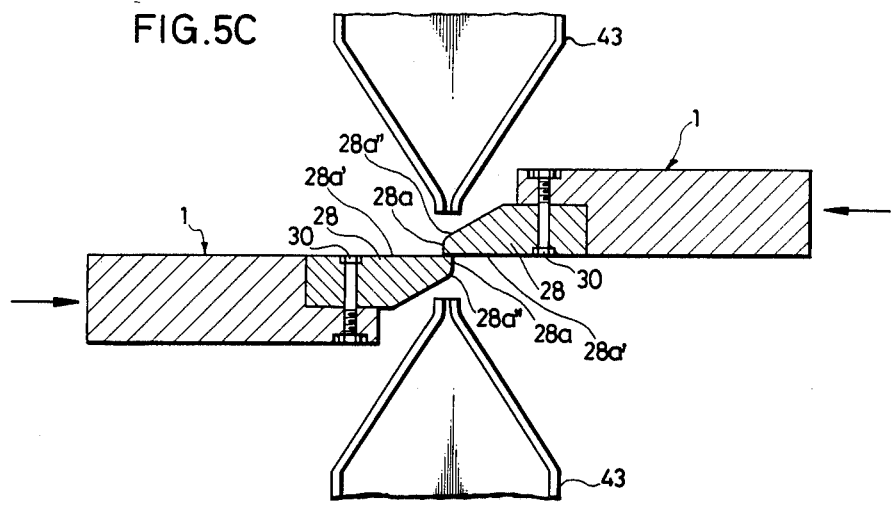

With the above-mentioned construction and arrangement of the components of the apparatus of the present invention, in operation, the piston rod 17a of the hydraulic cylinder 17 is first of all retracted to position the jaw members 1, 1 in the open position as shown by the solid lines in FIG. 1. With the jaw members 1, 1 maintained in the open position, the arm 9 of the working machine and hydraulic cylinder 11 are manipulated to position the workpiece 43 is the position between the crushing blades 25, 25 as shown by the solid line in FIG. 1. Thereafter, the piston rod 17a of the oil cylinder 17 is extended from the retracted position to pivot the jaw members 1, 1 to the closed position as shown by the chain line in FIG. 1 whereby the cutting edge tips 25a, 25a of the crushing blades 25, 25 pinch and crush the workpiece 43 on selected portions thereof as shown in FIG. 5A. The crushing degree of the workpiece 43 is limited by the abutment of the base end shoulders 1c, 1c of the jaw members 1, 1 against the adjacent end faces 23a, 23a on the stopper members 23, 23. Thereafter, the piston rod 17a of the hydraulic cylinder 17 is retracted to open the jaw members 1, 1 and the working machine arm 9 and hydraulic cylinder 11 are again manipulated to position the crushed portions 43a on the workpiece 43 in the position between the shearing blades 28, 28 as shown by the chain line in FIG. 1. Thereafter, the piston rod 17a of the hydraulic cylinder 17 is again extended to close the jaw members 1, 1 as shown by the chain line in FIG. 1 whereby the shearing blades 28, 28 shear off the workpiece 43 on the crushed portions 43a as shown in FIGS. 5B, 5C. At this time, the closed position of the jaw members 1, 1 is limited by the end faces 23a, 23a on the stopper members 23, 23 as mentioned hereinabove. When the workpiece 43 is formed of ordinary sheet metal or light weight shaped steel, the workpiece can be directly sheared off by the shearing blades 28, 28 without precrushing by the crushing blades 25, 25.

Thus, according to the present invention, since it is only necessary that the workpiece 43 is initially crushed to a certain degree by the crushing blades 25, 25, no substantial crushing force is required and thus, there is no possibility of blade nicking. Furthermore, as more clearly shown in FIG. 5B, the shearing blades 28, 28 adapted to shear off the crushed portions 43a of the workpiece 43 can be easily and positively set on the crushed portions 43a where the workpiece 43 has a minimum cross-sectional area by the guiding action which results for contact between the tip of the inclined back surfaces 28a" of the shearing blades 28 and the ramps 43b on the workpiece 43. Furthermore, since the minimum cross-sectional area of the crushed portions 43a in cracked or is about to crack under the crushing action of the crushing blades 25, 25, the shearing blades can effectively or easily shear off the workpiece with a small force and at the same time, prevent the workpiece from slipping towards the leading ends of the blades. In addition, since the thickness of the workpiece 43 is locally reduced by the crushing, the workpiece 43 is restrained from rotating (in the counter-clockwise direction as seen in FIG. 5B) when the shearing blades 28, 28 shear off the workpiece.

And according to the present invention, at the leading ends of the jaw members 1, 1 the projections 31a, 31b protrude in opposing relationship inwardly from their respectively associated edge tips 25a", 25a' on the crushing blades 25, 25 whereby while being crushed by the crushing blades 25, 25, the workpiece 43 abuts against the projections 31a, 31b which in turn restrain the workpiece from slipping towards the leading ends of the crushing blades 25, 25. Thus, the crushing blades 25, 25 may be of short length and crushing force can be positively transmitted from the blades 25, 25 to the workpiece 43 resulting in improvement in crushing efficiency. Thus, workpieces having different shapes can be properly and positively crushed. The steel frame shearing apparatus of the invention is suitably applied to shearing-off of various steel structural shaped steel workpieces including the illustrated H-section shaped steel workpiece, steel frame workpieces in concrete structures and body frame workpieces for automobiles. And the projections 31a, 31b can also serve as means for gripping the processed workpiece for transporting, lifting and removing the workpiece.

The present invention is not limited to the embodiment described hereinabove.

In the foregoing embodiment, although both the two jaw members 1, 1 are designed to open and close, it can be designed that only one of the jaw members opens and closes, whilst the other jaw member is stationary within the scope of the invention.

Additionally, in the foregoing embodiment, the stopper members 23, 23 may be eliminated if desired and instead the jaw members 1, 1 may abut at their shoulders (the parts are not limited to the shoulders 1c, 1c)

against the connector bolts 4, 4 which serve as stopper members in such a case.

Furthermore, instead of being mounted on a travelling working machine such as a power shovel or the like the apparatus of the invention may be mounted on a stationary pedestal and workpieces to be processed may be fed to the apparatus. In such a case, the operation angle of the jaw members may be set to be constant.

Figure 6:
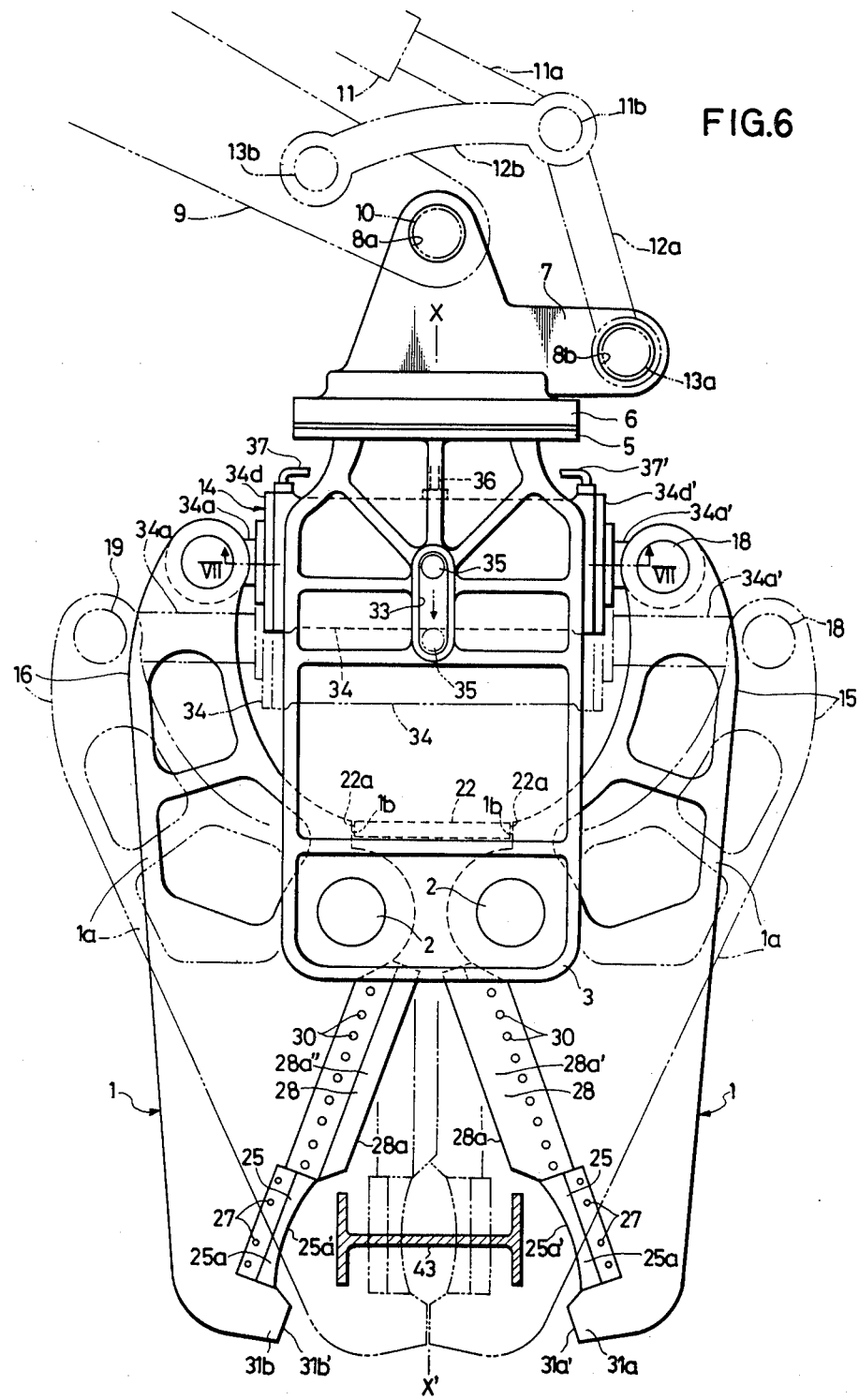
FIG. 6 is a side elevational view of another embodiment of the steel frame shearing apparatus of the present invention with a portion thereof cut away.
Figure 7:
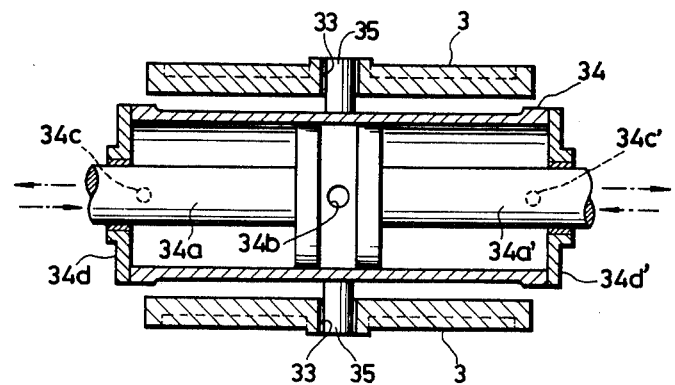
FIG. 7 is a cross-sectional view on an enlarged scale taken along the line VII—VII of FIG. 6.

FIGS. 6 and 7 show another embodiment of the present invention. In the embodiment, side plates 3, 3 are formed with grooves 33, 33 positioned in the center axis X—X' of the apparatus and slidably disposed within the grooves 33, 33 are the trunnions 35, 35 of a two-way movable hydraulic cylinder 34. The hydraulic cylinder 34 includes a pair of piston rods 34a, 34a' received in the opposite sides of the cylinder and the piston rods are adapted to extend and retract in symmetrical relationship at right angles to the center axis X—X' of the apparatus. The piston rods 34a, 34a' are pivoted to the projections 15, 16 at the base ends of the jaw members 1, 1 and the cylinder 34 is formed at the central area of its cylindrical wall with an oil pressure port 34b and oil pressure ports 34c, 34c' in the cylindrical wall adjacent to closure plates 34d, 34d' at the opposite ends of the cylindrical wall. The oil pressure ports 34b, 34c, 34c' are connected to the oil pressure source of the working machine through hoses 36, 37, 37', respectively.

The oil cylinder 34 is supplied with oil under pressure by communicating the cylinder with the oil pressure source via the oil pressure port 34b, 34c or 34c' to thereby extend or retract the piston rods 34a, 34a' in symmetrical relationship at right angles to the center axis X—X'. In the modified embodiment, since the hydraulic cylinder 34 is not allowed to move in its axial direction since it is limited by the grooves 33, 33 in the side plates 3, 3, the jaw members 1, 1 are opened and closed symmetrically with respect to the center axis X—X' by the piston rods 34a, 34a' and do not totter in any given opening position. Therefore, when the jaw members 1, 1 are to be opened, it is no longer required for the jaw members to be opened to their maximum opening so as to abut against the stopper members 22 to thereby hold the jaw members in the maximum opening position as described in connection with the first embodiment. And it is also unnecessary to use the stopper members 23, 23 as employed in the first embodiment to prevent the jaw members 1, 1 from tottering substantially as the jaw members are to be closed. thus, the jaw members 1, 1 can positively grip the workpiece 43 in the center axis X—X' in any given opening position of the jaw members. Especially when the workpiece 43 is of small dimensions, the opening defined by the jaw members can be reduced to accommodate the dimensions of the workpiece to enhance operational efficiency. In addition, there is no possibility that the jaw members abut against the workpiece in asymmetrical relationship with respect to the workpiece such as to produce any unbalanced reaction force which is undesirable for the apparatus. In the embodiment of FIG. 6, the opposing end faces 31a', 31b' on the projections 31a, 31b at the leading ends of the jaw members 1, 1 protruding inwardly from the cutting edge tips 25a', 25a' of the crushing blades 25, 25 are made flat. The remaining components of the second embodiment are identical with the corresponding components of the first embodiment and thus, the remaining components have the same reference numerals affixed thereto as those used for the corresponding components of the first embodiment so as to avoid the need for further explanation.

Figure 8:
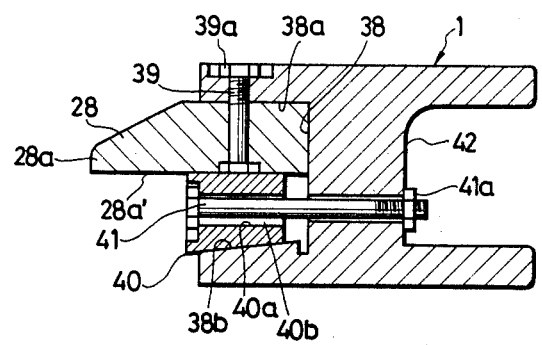
FIG. 8 is a cross-sectional view of modified means for securing the shearing blades to the jaw members.

FIG. 8 shows modified means for mounting the shearing blade 28 on the associated jaw member 1. A bolt 39 extends transversely from the blade surface 28a' of the shearing blade 28 in contact with one of the side walls 38a of the mounting groove 38 in the jaw member 1 through the blade and the jaw member to its outer surface, a nut 39a is fastened to the leading end of the bolt 39a, a wedge member 40 is interposed between an outwardly declined ramp 38b on the other side wall 38a of the jaw member groove 38 and the blade surface 28a' of the blade 28, a bolt 41 extends in a longitudinal through hole 40a in the wedge member 40 leaving a relief clearance 40b for the bolt 41 on the side of the ramp 38b through the jaw member 1 into an outer groove 42 in the jaw member 1 and a nut 41a is fastened to the leading end of the bolt 41. By the use of this modified mounting means, by tightening the nut 39a on the bolt 39, the shearing blade 28 can be secured to the side wall 38a of the mounting groove 38 and by tightening the nut 41a on the bolt 41, the wedge member 40 is forced into the gap between the blade surface 28a' of the shearing blade 28 and the ramp 38b whereby the wedge member 40 urges the shearing blade 28 against the groove side wall 38a' due to the inclination of the ramp 38b and more firmly secures the shearing blade 28. This mounting means assures positive securing of the shearing blades which otherwise tend to loosen in shearing operation. When the shearing blade 28 loosens during shearing operation, without detaching the blade 28 from the jaw member 1, the nuts 38a, 41a are retightened from outside to thereby secure the blade in a predetermined proper position on the jaw member.

It will be apparent to those skilled in the art that many changes may be made in the invention without departing from the spirit and scope thereof.

What is claimed is:

1. A steel frame shearing apparatus, comprising: a pair of opposing side plates (3), a pair of jaw members (1) individually pivoted to a pair of main shafts (2) disposed between said side plates, a drive mechanism (14) for causing at least one of said jaw members to perform opening and closing movements, a pair of crushing blades (25) individually mounted on outermost portions of said jaw members in opposing relationship for locally pinching and crushing a workpiece (43) positioned between said blades in response to the closing movement of said jaw member, and a pair of shearing blades (28) individually mounted on innermost portions of said jaw members in opposing relationship for shearing off a pinched and crushed portion of a workpiece in response to the closing movement of said jaw member.

2. The steel frame shearing apparatus as set forth in claim 1, in which a pair of opposing projections (31a, 31b) are individually formed at outermost ends of said jaw members protruding inwardly from cutting edge tips (25a') of said crushing blades.

3. The steel frame shearing apparatus as set forth in claim 1 or 2, in which said side plates have grooves (33) in a center line of said apparatus, trunnion pins (35) of a two-way movable hydraulic cylinder (34) are individually slidably received in said grooves, said hydraulic cylinder forms said drive mechanism and includes a pair of piston rods received in opposite sides of said cylinder for extending and retracting movement at right angles to said center line, and said piston rods are pivoted to projections (15, 16) at base ends of said jaw members.

4. The steel frame shearing apparatus as set forth in claim 1 or 2, in which each shearing blade is received in a first groove (38) provided in an associated jaw member in contact with a side wall (38*a*) defining the groove, with one blade surface facing another, opposite side wall of the groove, a first bolt (39) extends transversely from said one blade surface through the blade and the jaw member to an outer surface thereof, a nut (39*a*) is fastened at a leading end of said bolt, an outwardly declining ramp is formed on said opposite side wall of the groove, a wedge member (40) is interposed between said one blade surface and said ramp, a longitudinal through hole (40*a*) is formed in said wedge member, a second bolt (41) extends through the hole in said wedge member into a second groove (42) formed in the jaw member opposite said first groove, and a nut (41*a*) is fastened at a leading end of said second bolt.

* * * * *